Oct. 21, 1958  G. G. JORIS  2,857,432
PROCESS FOR THE PRODUCTION OF CYCLOHEXANONE
Filed Jan. 23, 1957
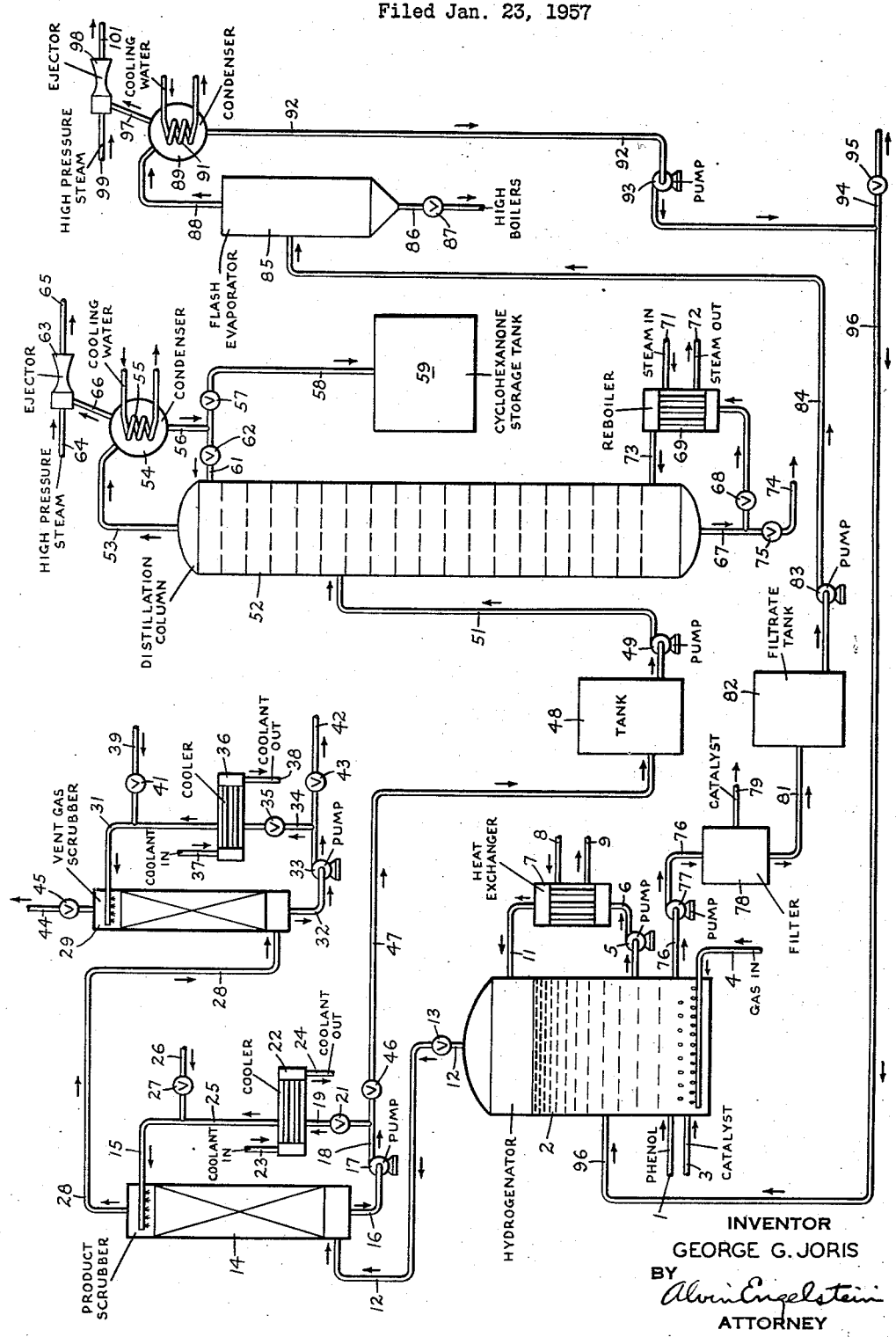
INVENTOR
GEORGE G. JORIS
BY
Alvin Engelstein
ATTORNEY

2,857,432
PROCESS FOR THE PRODUCTION OF CYCLOHEXANONE

George G. Joris, Madison, N. J., assignor to Allied Chemical Corporation, New York, N. Y., a corporation of New York Application January 23, 1957, Serial No. 635,850

9 Claims. (Cl. 260—586)

This invention relates to the production of cyclohexanone and more particularly refers to a new and improved process for hydrogenating phenol in the presence of a palladium catalyst for the production of cyclohexanone.

One object of the present invention is to provide an efficient, economical process for converting phenol into high yields of cyclohexanone.

Another object of the present invention is to provide a continuous process for catalytically hydrogenating phenol to cyclohexanone without substantial separation of the catalyst from the reaction mixture.

A further object of the present invention is to provide a continuous process for the catalytic hydrogenation of phenol to cyclohexanone wherein a concentrated cyclohexanone product free of catalyst is continuously removed from the reaction mixture.

A still further object of the present invention is to provide a continuous process for the hydrogenation of phenol in the presence of a palladium catalyst for the production of cyclohexanone at high reaction rates with a minimum of by-product formation. Other objects and advantages of the present invention will be apparent from the following description and accompanying drawing.

In accordance with the present invention, cyclohexanone is continuously produced by maintaining a body of a mixture of cyclohexanone and phenol having dispersed therein finely divided palladium catalyst at an elevated temperature, preferably within the range of about 100–200° C., said body containing between 30–80%, preferably 50–70%, by weight cyclohexanone, continuously passing hydrogen into said body to catalytically hydrogenate the phenol to cyclohexanone, continuously passing a gas through said body to remove cyclohexanone as vapors free of catalyst substantially as formed, and introducing phenol into said body to maintain the body substantially constant.

During the reaction, small amounts of high boiling materials, termed "high boilers," are formed as a by-product. The quantity of such high boiling constituents is very small, usually well below 1% of the feed phenol and more commonly below 0.1% of the feed phenol. Ordinarily, these high boilers may remain in the reaction mixture for extended periods of time without impairment of the operation. However, if the high boilers accumulate to an undesirable extent, they may be continuously or intermittently purged from the system by withdrawing a small amount, usually less than 5%, of the reaction mixture containing the high boilers. The thus withdrawn reaction mixture may be filtered to separate the catalyst and the filtrate evaporated to remove the phenol and cyclohexanone, which phenol and cyclohexanone may be returned to the reaction mixture for further treatment.

In pending U. S. application Serial No. 579,718, entitled "Hydrogenation of Phenol," filed April 23, 1956, is disclosed a process of producing cyclohexanone by hydrogenating phenol in the presence of a palladium catalyst. This pending application describes carrying out the hydrogenation reaction in a batch manner wherein phenol is charged to a vessel and hydrogen passed through the phenol in the vessel in the presence of a catalyst to react with the phenol to form cyclohexanone. The resultant reaction products, consisting of a mixture of cyclohexanone, catalyst and other organic materials such as high boilers, cyclohexanol and unreacted phenol, are then subjected to a separation and distillation operation, such as filtration, to remove catalyst, and fractionation to separate the cyclohexanone from the other organic materials. The pending application also describes conducting the hydrogenation operation in a continuous manner wherein hydrogen is continuously reacted with phenol in the presence of a palladium catalyst to form cyclohexanone and the reaction mixture consisting of cyclohexanone, palladium catalyst, unreacted phenol, cyclohexanol and high boilers is continuously withdrawn. The reaction mixture is then subjected to separation and fractionation treatment for removal of catalyst and recovery of cyclohexanone. While these operations are satisfactory, they do have the disadvantages of removal of active catalyst from the reaction zone with attendant difficulties and expense of separating catalyst from the reaction products and recycling such catalyst to reaction zone; withdrawal of unreacted phenol from the reaction zone; separation of such unreacted phenol from the reaction products and recycling such unreacted phenol to the reaction zone. Direct fractional distillation of the reaction mixture with catalyst content on a large scale continuous operation requires special care because of interference of solid catalysts with the functioning of the fractionating column and because of explosion hazards due to air leakage under the vacuum conditions of the distillation. Special care is also required in the filtering operation because of the finely divided contents of the catalyst and the activity of palladium as combustion catalyst in the presence of the air. Also to attain high reaction rates and a minimum amount of by-product cyclohexanol and high boilers, it is desirable to effect incomplete hydrogenation of the phenol, i. e. to produce less than 80%, preferably less than 70%, cyclohexanone. Under these circumstances, the reaction mixture contains appreciable amounts of unreacted phenol. This, of course, entails separation of such phenol from the desired reaction product.

In the continuous process of the present invention, it is unnecessary to separate catalyst from the reaction mixture and, further, the process may be carried out with high reaction rates and minimum by-product formation while retaining in large measure unreacted phenol in the reaction zone.

The accompanying drawing diagrammatically illustrates one method of carrying out the present invention.

Referring to the drawing, phenol feed is charged through line 1 into hydrogenator 2 to a level from about ½ to ¾ the height of the vessel. Finely divided palladium catalyst is also introduced into hydrogenator 2 through line 3. Although palladium as such may be employed as a catalyst, it is preferably extended or deposited upon an inert carrier or solid support such as alumina or carbon. The supported catalyst may contain conveniently from about 1% to about 10% palladium by weight, a satisfactory and typical catalyst containing about 5% by weight of palladium. The quantity of catalyst employed with respect to phenol is not critical and may range, for example, from 0.1 part to 10 or even 100 or more parts to each 1,000 parts by weight of phenol charge. In its preferred or supported form, satisfactorily effective quantities of typical catalyst, 5% palladium on finely divided activated carbon or activated alumina dispersed throughout the phenol, may be as low as 1 to 10 parts per 1,000 parts of phenol. In many instances 1 part of total catalyst, palladium plus support, per 1,000 parts of phenol, when dispersed in finely divided form throughout the phenol, is adequate for effecting hydrogenation of the phenol. Dispersion of the catalyst throughout the body of phenol will ordinarily be maintained by the passage of gas entering through line 4 bubbling up through the body of liquid in hydrogenator 2, but additional means such as a stirrer, not shown in the drawing, may be provided to agitate the contents of hydrogenator 2.

Reaction of hydrogen introduced through line 4 with phenol occurs at a temperature above about 50° C. but preferably is carried out at a temperature within the range of 100–200° C. The reaction may be conducted under sub- and superatmospheric pressure, but desirably is carried out at approximately atmospheric pressure to low superatmospheric pressure not exceeding about 50 p. s. i. g. The phenol charge entering through line 1 may be preliminarily preheated to the desired temperature within the range of 100–200° C. prior to the introduction into hydrogenator 2. Alternatively, the phenol may be brought to the desired temperature of 100–200° C. by circulating a portion of the body of phenol by means of pump 5, through line 6, heat exchanger 7, wherein it passes in indirect heat exchange with a heating medium such as steam entering through line 8 and discharging through line 9, and the heated phenol returned via line 11 to hydrogenator 2. After the desired reaction temperature has been attained, a continuous stream of hydrogen gas entering through line 4 is passed up through the body of phenol in hydrogenator 2 to react with the phenol to form cyclohexanone until the concentration of cyclohexanone is within the range of 30–80% by weight of the reaction mixture, preferably within the range of 50–70%. Operation with a concentration below about 30% cyclohexanone is inefficient. Operation at a concentration above 80% tends to form more by-products and is, therefore, desirably avoided. Furthermore, the rate of reaction of hydrogen with phenol to form cyclohexanone at concentrations above 80% cyclohexanone is appreciably lower than at the lower concentrations. The temperature at which hydrogenation of the phenol is carried out also has an effect on the reaction. At reaction temperature within the range of 100–150° C., the selectivity of conversion of phenol to cyclohexanone is outstandingly high. Although the selectivity of the reaction is not as good at higher temperatures, namely 150–200° C., the higher reaction temperatures do increase the rate of reaction, and in certain instances where high selectivity is not an important factor, it may be desirable to operate at the higher temperatures to obtain the benefit of the increased reaction rate. The reaction will proceed at high superatmospheric pressure, e. g. 300 p. s. i. g., but high superatmospheric pressure has several disadvantages, among which are a tendency to increase by-product formation, requirement of heavy expensive equipment, and increased pumping costs and repression of volatilization of the desired cyclohexanone product from the reaction mixture. The preferred method for carrying out the operation in accordance with the present invention is under substantially atmospheric pressure to low superatmospheric pressure, not exceeding about 50 p. s. i. g.

After the contents of hydrogenator 2 have reached the desired temperature and concentration of cyclohexanone, the temperature may be maintained at a constant value by circulating some of the vessel contents through heat exchanger 7 in indirect contact with a cooling or heating fluid entering through line 8 and discharging through line 9. The next step in the operation is to introduce excess gas into the body of liquid in hydrogenator 2 in an amount sufficient to strip cyclohexanone from the body substantially as rapidly as formed so as to maintain the concentration of cyclohexanone in the body substantially constant. About 2–6, more generally about 2.5–4, cubic feet of gas measured at standard conditions of temperature (0° C.) and pressure (760 mm.) are needed to strip and carry away as vapor from the liquid body one pound of cyclohexanone. The stripping gas may be a large excess of hydrogen gas entering through line 4, but preferably is a mixture of an inert gas such as nitrogen with hydrogen, which mixtures are readily available and termed synthesis gas in the art. The advantages of stripping the cyclohexanone product as formed as a vapor with a gas in accordance with the present invention are manyfold. Of great importance, it produces a product free of catalyst having higher concentration of cyclohexanone and a lower concentration of phenol than existing in the body undergoing reaction. Concurrently, it permits retention of a greater amount of unreacted phenol as compared to conventional operation wherein the reaction products are withdrawn from the reaction zone for recovery of the desired cyclohexanone product. It permits all or substantially all the catalyst to remain in the reaction zone and eliminates the necessity for withdrawing large amounts of catalyst from the reaction zone and the necessity with attendant difficulties of separating the catalyst and recycling it to the reaction zone. Because the product is more concentrated and free of catalyst, it simplifies subsequent purification and recovery of cyclohexanone.

The vapors carried by the gas leaving the top of the liquid body in hydrogenator 2 consisting principally of cyclohexanone and minor amounts of phenol and cyclohexanol are released through line 12 and valve 13 and introduced into the bottom of scrubber 14, which may be any suitable tower containing trays or filled with packing such as Raschig rings or Berl saddles, wherein it passes upwardly countercurrent to a cooling and scrubbing liquid entering the top of scrubber 14 through line 15 to effect condensation of the vapors entering through line 12 and separation of such vapors from the gases. Liquid condensate is withdrawn from the bottom of scrubber 14 through line 16 by means of pump 17. A suitable cooling or scrubbing medium is a liquid condensate collecting in the bottom of scrubber 14 which may be sent through lines 18 and 19, valve 21 through cooler 22 where it passes in indirect heat exchange with a coolant such as water entering line 23 and discharging through line 24, and the cooled condensate then introduced into the top of scrubber 14 through lines 25 and 15. To initiate the operation, a cooling medium may be introduced through line 26, valve 27 and line 15 into the top of scrubber 14. Although not a preferred method of operation, the vapors leaving hydrogenator 2 may be condensed by indirect exchange with a cooling medium. The non-condensable gases released from the top of scrubber 14 through line 28 may contain some vapors which, while small in amount, might be worth recovering. The released gases are, therefore, sent to a vent gas scrubber 29 which, while smaller, is similar in construction to scrubber 14. A cooling liquid is introduced into the top of vent gas scrubber 29 through line 31 and passes downwardly through the scrubber countercurrent to the rising gases and vapors to effect removal of the vapors from the gases. Liquid condensate collecting in the bottom of vent gas scrubber 29 may be used as a scrubbing liquid and is withdrawn through line 32 and sent by pump 33 through line 34, valve 35, through cooler 36, wherein it passes in indirect heat exchange with a cooler such as water entering through line 37 and discharging through line 38, and then passes upwardly through line 31 into the top of vent gas scrubber 29. To initiate the operation, a scrubbing liquid may be introduced through line 39, valve 41 and line 31 into scrubber 29. Excess liquid condensate accumulating in vent gas scrubber 29 may be discharged through line 42 and valve 43 and, if desired, returned to hydrogenator 2 or commingled with the product released from the bottom of product scrubber 14. The non-condensable gases are released from the top of vent gas scrubber 29 through line 44 and valve 45. In most instances, it will be found practical to admix hydrogen gas with the gases flowing through line 44 and pass this mixture of gases through line 4 into the bottom of hydrogenator 2 in contact with the body of liquid therein.

The liquid condensate product containing principally cyclohexanone and minor amounts of phenol and cyclohexanol is discharged from the bottom of product scrubber 14 through line 16 and sent by pump 17, through line 18, valve 46 and line 47 into product storage tank 48. Separation and recovery of pure cyclohexanone from the cyclohexanone product in tank 48 may be accomplished by directing the product from tank 48 by means of pump 49, through line 51 into distillation column 52 which is a suitable fractionating tower such as a column equipped with a plurality of spaced bubble cap plates wherein the product is subjected to rectification under reduced pressure below about 300 mm. of mercury and a top temperature of about 50–100° C. and the bottom temperature of about 100–150° C. Substantially pure cyclohexanone passes off as vapor from the top of column 52 through line 53, passes through condenser 54 in indirect heat exchange with cooling coil 55 through which cooling water flows and the condensate discharges through line 56, valve 57, line 58 into cyclohexanone storage tank 59. A portion of the condensate may be returned through line 61 and valve 62 to the top of column 52 for cooling and to provide reflux. Vacuum on the tower may be obtained by means of ejector 63 through which high pressure steam enters through line 64 and discharges through line 65 and which ejector is connected by means of line 66. Heat is provided to tower 52 by flowing a portion of the tower bottoms through line 67, valve 68, thence through reboiler 69 wherein the bottoms are heated by indirect heat exchange with steam entering through line 71 and discharging through line 72 and the heated bottoms returned to the tower through line 73. Bottoms consisting principally of phenol, cyclohexanol and some cyclohexanone are discharged from the bottom of tower 52 through line 74 and valve 75, and, if desired, may be subjected to further treatment for separation into their components or the mixture may be treated to convert the phenol to cyclohexanol.

Hydrogenation of phenol to cyclohexanone in hydrogenator 2 may be carried out continuously for extended periods of days and even weeks without withdrawal of liquid or solid from the body of the reaction products. During this extended period of operation, small amounts of high boilers may be formed as a by-product and accumulate in the reaction mixture. If it is desired to purge the system of these high boilers to keep them down to the lower level, a small amount of reaction mixture of the order of a few percent may be withdrawn through line 76 and sent by pump 77 to filter 78 wherein catalyst is separated from the liquid reaction products and catalyst removed from filter 78 through line 79 may be returned to hydrogenator 2. In order to give some idea of the minuteness of amount of catalyst withdrawn from the system for this purpose, it will be noted that in treating approximately 10,000 lbs. of phenol per hour, the withdrawal of less than 10 lbs. of catalyst per hour is adequate. Filtrate from filter 78 may be sent through line 81 to filtrate tank 82 which acts in the nature of a surge tank. Since the filtrate contains cyclohexanone as well as unreacted phenol and some cyclohexanol in admixture with the high boilers, the filtrate may be passed by pump 83 through line 84 into flash evaporator 85 maintained under reduced pressure to effect vaporization of the more volatile cyclohexanone, phenol and cyclohexanol leaving the less volatile high boilers as liquid in the bottom of flash evaporator 85. The high boilers may be discharged from the system through line 86 and valve 87. Vapors from the top of flash evaporator 85 flow through line 88 into condenser 89 wherein they pass in indirect heat exchange with cooling coil 91 through which cooling water flows and the condensate then passes through line 92 and then may be sent by means of pump 93 through line 94 and valve 95 to storage, or preferably returned through line 96 to hydrogenator 2 for further reaction and recovery of cyclohexanone. Reduced pressure on flash evaporator 85 may be maintained through line 97, connected to ejector 98 into which high pressure steam enters through line 99 and discharges through line 101.

The following example illustrates the present invention:

240,000 lbs. of phenol are charged into a hydrogenator vessel having the dimensions of 12 ft. in diameter and 50 ft. high. 2,400 lbs. of a finely divided palladium catalyst of 200 mesh, composed of 5% palladium on charcoal support is charged into the hydrogenator. Mixture of phenol and catalyst is heated to a temperature of 145° C. and maintained at that temperature. Hydrogen gas, at the rate of 69,000 cu. ft. per hour measured under standard conditions of temperature and pressure, is introduced into the body of the phenol to react with the phenol to form cyclohexanone until the concentration of cyclohexanone in the body of phenol is 75% by weight as determined by periodic withdrawal of samples from the body. Thereafter, a mixture of nitrogen gas and hydrogen, at the rate of 23,000 cu. ft. $N_2$ and 69,000 cut. ft. $H_2$, are continuously bubbled up through the body of phenol-cyclohexanone-catalyst. Feed phenol is continuously introduced into the hydrogenator at the rate of 7,800 lbs. per hour. Gases and vapors constituting principally cyclohexanone, a minor amount of unreacted phenol and some cyclohexanol are continuously evolved and released from the hydrogenator. Pressure on the hydrogenator is maintained at 2 p. s. i. g. Vapors in the gas are condensed, separated from the gas and collected. The liquid condensate, at the rae of 8,150 lbs. per hour, is introduced into a 10 ft. diameter fractionating tower equipped with 60 bubble cap trays maintained under vacuum with a top temperature and pressure of 75° C. and 50 mm. and a bottom temperature and pressure of 125° C. and 175 mm. The overhead product of the fractionating column constitutes 8,010 lbs. per hour substantially pure cyclohexanone. The tower bottoms is a mixture of 100 lbs. per hour phenol, 5 lbs. per hour cyclohexanol and 35 lbs. per hour cyclohexanone. After eight days' continuous operation, a small stream of reaction products, at the rate of 505 lbs. per hour, are continuously withdrawn from the hydrogenator, filtered to separate 5 lbs. per hour catalyst and the filtrate is passed into a flash evaporator maintained under reduced pressure to separate 25 lbs. per hour high boilers and 475 lbs. per hour of a mixture of 75 lbs. per hour phenol, 375 lbs. per hour cyclohexanone and 25 lbs. per hour cyclohexanol. Catalyst at the rate of 5 lbs. per hour and additional feed phenol at the rate of 500 lbs. per hour is introduced into the hydrogenator to compensate that withdrawn from the hydrogenator.

Although certain preferred embodiments of the invention have been disclosed for purpose of illustration, it will be evident that various changes and modifications may be made therein without departing from the scope and spirit of the invention.

I claim:

1. A continuous process for the production of cyclohexanone which comprises maintaining a liquid body of a mixture of cyclohexanone and phenol having dispersed therein finely divided palladium catalyst at an elevated temperature, said body containing between 30–80% by weight cyclohexanone, continuously passing hydrogen into said body to catalytically hydrogenate the phenol to cyclohexanone, continuously passing a gas through said body to remove cyclohexanone as vapor free of catalyst substantially as formed to maintain the concentration of cyclohexanone in said body between 30–80% by weight, and introducing phenol into said body to maintain the body substantially constant.

2. A continuous process for the production of cyclohexanone which comprises maintaining a liquid body of a mixture of cyclohexanone and phenol having dispersed therein finely divided palladium catalyst at an elevated temperature within the range of about 100–200° C., said body containing between 50–70% by weight cyclohexanone, continuously passing hydrogen into said body to catalytically hydrogenate the phenol to cyclohexanone, continuously passing a gas through said body to remove cyclohexanone as vapor free of catalyst substantially as formed to maintain the concentration of cyclohexanone in said body between 50–70% by weight, and introducing phenol into said body to maintain the body substantially constant.

3. A continuous process for the production of cyclohexanone which comprises maintaining a liquid body of a mixture of cyclohexanone and phenol having dispersed therein finely divided palladium catalyst at an elevated temperature within the range of about 100–200° C., said body containing between 50–70% by weight cyclohexanone, continuously passing hydrogen and nitrogen into said body to catalytically hydrogenate the phenol to cyclohexanone and to remove cyclohexanone as vapor free of catalyst substantially as formed to maintain the concentration of cyclohexanone in said body within the range of 50–70%, said hydrogen and nitrogen gases being introduced in an amount sufficient to provide 2–6 cu. ft. of gas measured at standard conditions of temperature and pressure of unreacted gas for each pound of cyclohexanone formed, and introducing phenol into said body to maintain the body substantially constant.

4. A continuous process for the production of cyclohexanone which comprises maintaining a liquid body of a mixture of cyclohexanone and phenol having dispersed therein finely divided palladium catalyst at an elevated temperature, said body containing between 30–80% by weight cyclohexanone, continuously passing hydrogen into said body to catalytically hydrogenate the phenol to cyclohexanone, continuously passing a gas through said body to remove cyclohexanone as vapor free of catalyst substantially as formed to maintain the concentration of cyclohexanone in said body between 30–80% by weight, passing said gas and vapor removed from said body in direct contact with a cooler liquid scrubbing medium to effect condensation of the vapor and separation from the gas, and introducing phenol into said body to maintain the body substantially constant.

5. A continuous process for the production of cyclohexanone which comprises maintaining a liquid body of a mixture of cyclohexanone and phenol having dispersed therein finely divided palladium catalyst at an elevated temperature, said body containing between 30–80% by weight cyclohexanone, continuously passing hydrogen into said body to catalytically hydrogenate the phenol to cyclohexanone, continuously passing a gas through said body to remove cyclohexanone as vapor free of catalyst substantially as formed to maintain the concentration of cyclohexanone in said body between 30–80% by weight, continuously condensing said vapor in said gas removed from the body undergoing reaction, continuously cooling a portion of said condensate, continuously passing said cooled portion of condensate countercurrent to and in direct contact with said mixture of gas and vapor to effect condensation of the vapor and separation from the gas, and introducing phenol into said body to maintain the body substantially constant.

6. A continuous process for the production of cyclohexanone which comprises maintaining a body liquid of a mixture of cyclohexanone and phenol having dispersed therein finely divided palladium catalyst at an elevated temperature within the range of about 100–200° C., said body containing between 50–70% by weight cyclohexanone, continuously passing hydrogen and nitrogen into said body to catalytically hydrogenate the phenol to cyclohexanone and to remove cyclohexanone as vapor free of catalyst substantially as formed to maintain the concentration of cyclohexanone in said body within the range of 50–70%, said hydrogen and nitrogen gases being introduced in an amount sufficient to provide 2–6 cu. ft. of gas measured at standard conditions of temperature and pressure of unreacted gas for each pound of cyclohexanone formed, continuously condensing said vapor in said gas removed from the body undergoing reaction, continuously cooling a portion of said condensate, continuously passing said cooled portion of condensate countercurrent to and in direct contact with said mixture of gas and vapor to effect condensation of the vapor and separation from the gas, and introducing phenol into said body to maintain the body substantially constant.

7. A continuous process for the production of cyclohexanone which comprises maintaining a liquid body of a mixture of cyclohexanone and phenol having dispersed therein finely divided palladium catalyst at an elevated temperature, said body containing between 30–80% by weight cyclohexanone, continuously passing hydrogen into said body to catalytically hydrogenate the phenol to cyclohexanone, continuously passing a gas through said body to remove cyclohexanone as vapor free of catalyst substantially as formed to maintain the concentration of cyclohexanone in said body between 30–80% by weight, withdrawing a small amount of reaction products from said body to purge the system of high boiling constituents formed as a by-product during the reaction of hydrogen with phenol to form cyclohexanone, and introducing phenol into said body to maintain the body substantially constant.

8. A continuous process for the production of cyclohexanone which comprises maintaining a liquid body of a mixture of cyclohexanone and phenol having dispersed therein finely divided palladium catalyst at an elevated temperature, said body containing between 30–80% by weight cyclohexanone, continuously passing hydrogen into said body to catalytically hydrogenate the phenol to cyclohexanone, continuously passing a gas through said body to remove cyclohexanone as vapor free of catalyst substantially as formed to maintain the concentration of cyclohexanone in said body between 30–80% by weight, withdrawing less than 5% of the reaction mixture containing high boiling constituents formed as a by-product during the hydrogenation of phenol into cyclohexanone in said body, separating catalyst from said withdrawn portion, subjecting said withdrawn portion after separation of catalyst under reduced pressure to evaporate volatile constituents and leave as liquid residue the high boiling constituents, returning the thus separated volatile constituents free of catalyst and high boiling constituents to said body for further reaction, and introducing phenol into said body to maintain the body substantially constant.

9. A continuous process for the production of cyclohexanone which comprises maintaining a liquid body of a mixture of cyclohexanone and phenol having dispersed therein finely divided palladium catalyst at a temperature within the range of about 100–200° C., said body containing between 50–70% by weight cyclohexanone, continuously passing hydrogen and nitrogen into said body to catalytically hydrogenate the phenol to cyclohexanone and to remove cyclohexanone as vapor free of catalyst substantially as formed to maintain the concentration of cyclohexanone in said body within the range of 50–70%, said hydrogen and nitrogen gases being introduced in an amount sufficient to provide 2.5–4 cu. ft. of gas measured at standard conditions of temperatures and pressure of unreacted gas for each pound of cyclohexanone formed, continuously condensing said vapor in said gas removed from the body undergoing reaction, continuously cooling a portion of said condensate, continuously passing said cooled portion of condensate countercurrent to and in direct contact with said mixture of gas and vapor to effect condensation of the vapor and separation from the gas, continuously subjecting another portion of said condensate to rectification under subatmospheric pressure to separate and recover substantially pure cyclohexanone, withdrawing less than 5% of the reaction mixture containing high boiling constituents formed as a by-product during the hydrogenation of phenol to cyclohexanone in said body, separating catalyst from said withdrawn portion, subjecting said withdrawn portion after separation of catalyst under reduced pressure to evaporate volatile constituents and leave as liquid residue the high boiling constituents, condensing and returning the thus separated volatile constituents free of catalyst and high boiling constituents to said body for further reaction, and continuously introducing phenol into said body to maintain the body substantially constant.

References Cited in the file of this patent

UNITED STATES PATENTS

| | | |
|---|---|---|
| 2,328,719 | Houghton et al. | Sept. 7, 1943 |
| 2,443,015 | Whitaker et al. | June 8, 1948 |